United States Patent [19]
Leva

[11] 3,926,592
[45] Dec. 16, 1975

[54] ENTRAINMENT SEPARATOR IN CO-CURRENT FLOW

[76] Inventor: Max Leva, 10 Hodgson Ave., Pittsburgh, Pa. 15205

[22] Filed: Sept. 3, 1974

[21] Appl. No.: 502,786

[52] U.S. Cl. .................. 55/84; 55/257; 55/233; 261/116
[51] Int. Cl.² .................................. B01D 47/00
[58] Field of Search ............... 55/84, 257, 90, 233; 261/94, 95, 98, 109, 111, 110, 112, 116

[56] References Cited
UNITED STATES PATENTS

| | | | |
|---|---|---|---|
| 2,754,096 | 7/1958 | Welty, Jr. | 261/97 |
| 3,237,381 | 3/1966 | Hrostoff et al. | 55/257 X |
| 3,406,953 | 10/1968 | Moore | 261/94 X |
| 3,550,356 | 12/1970 | Abboud | 55/257 X |
| 3,699,748 | 10/1972 | Barkovitz | 55/257 X |
| 3,739,551 | 6/1973 | Eckert | 261/94 |
| 3,817,713 | 6/1974 | Ionescu | 55/257 X |

Primary Examiner—John Adee
Assistant Examiner—Ethel R. Cross
Attorney, Agent, or Firm—William J. Ruano

[57] ABSTRACT

Apparatus and method of separating entrained liquids from gases. Separate streams of liquid and gas are introduced into the top of a tower and the liquid is formed into a dispersed state entrained by gas and passes downwardly through a contacting zone. The combined streams of gas and entrained liquid exiting from said contacting zone are directed against slanted baffle plates located below the zone causing the dispersed liquid to wet the plates and form a liquid layer running downwardly towards the lower edge of the plates and emptying into a sump of the tower. The released gas, substantially freed of liquid, is conducted to an exit opening of the tower.

14 Claims, 13 Drawing Figures

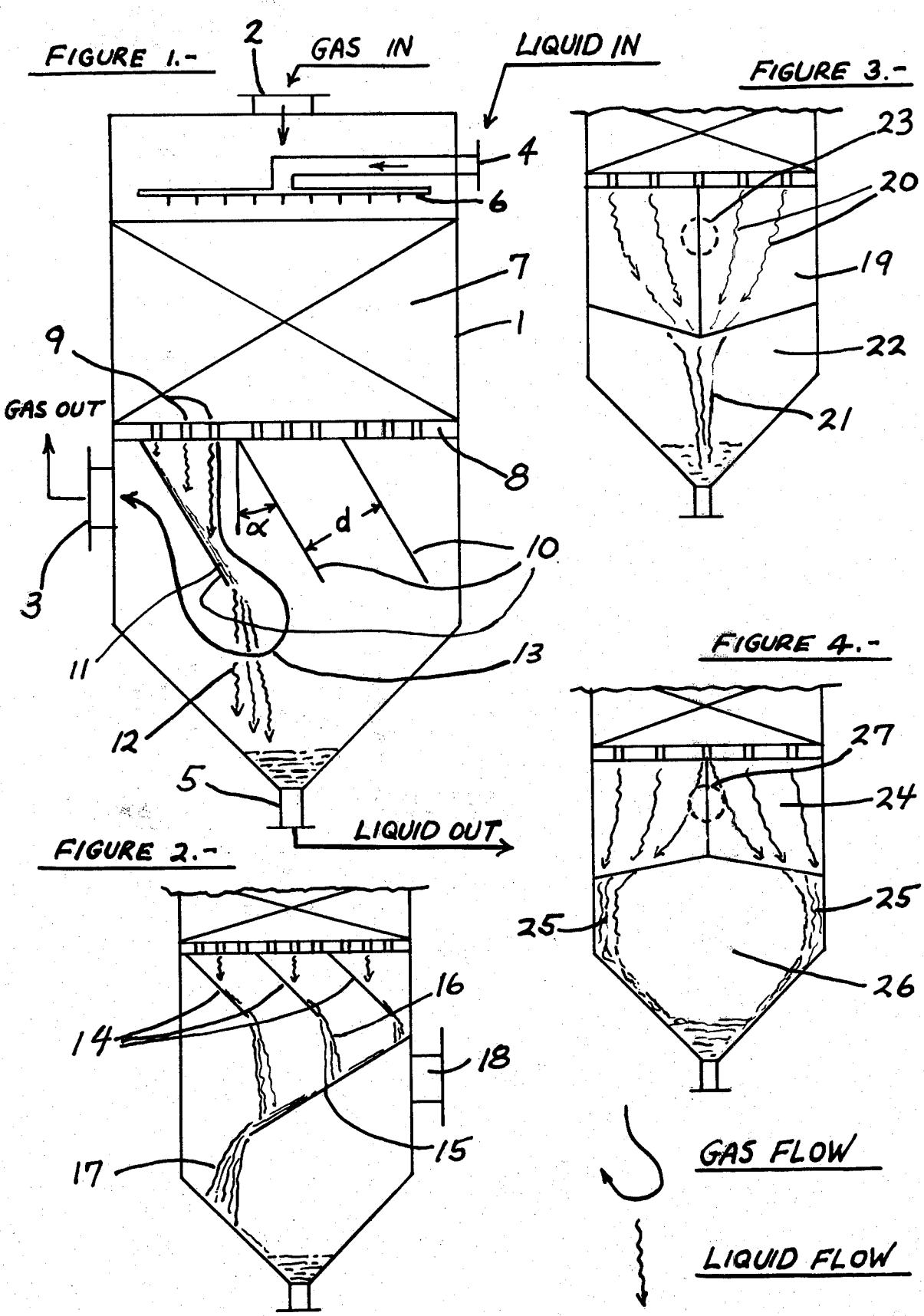

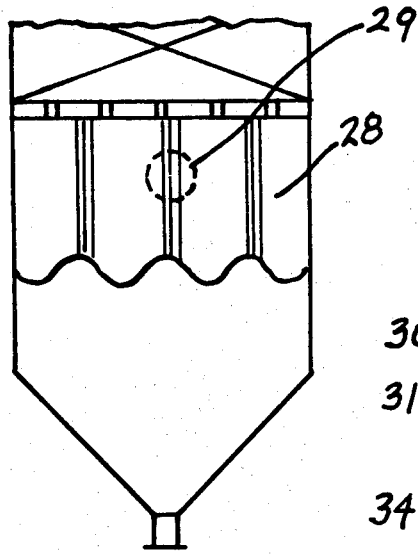
FIGURE 5.-
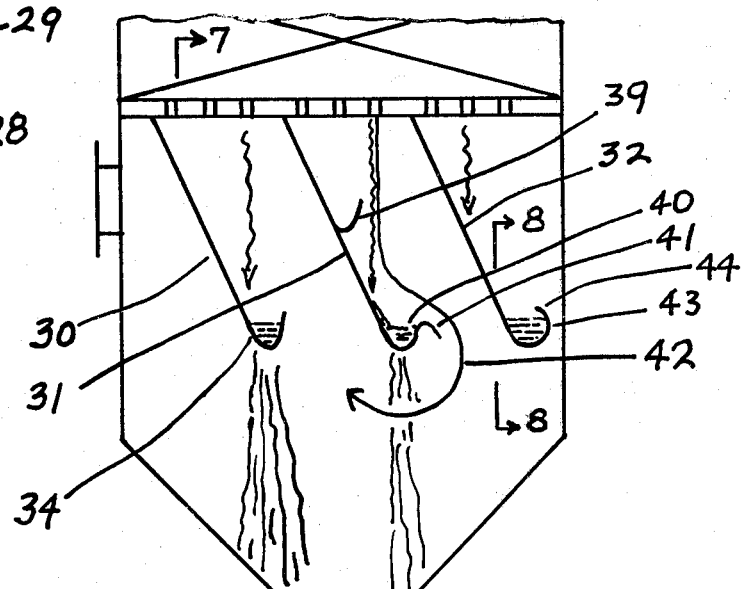
FIGURE 6.-
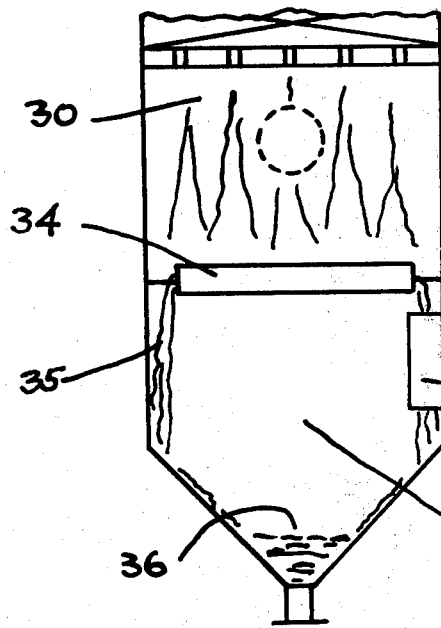
FIGURE 7.-
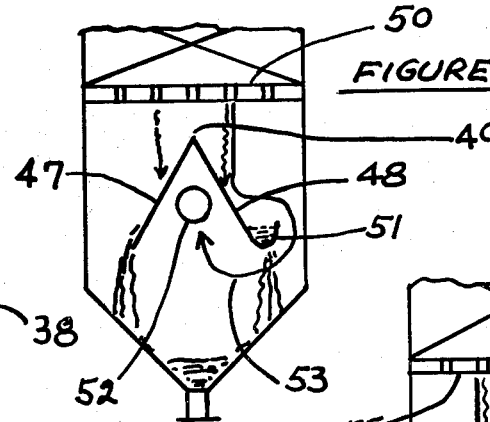
FIGURE 9.-
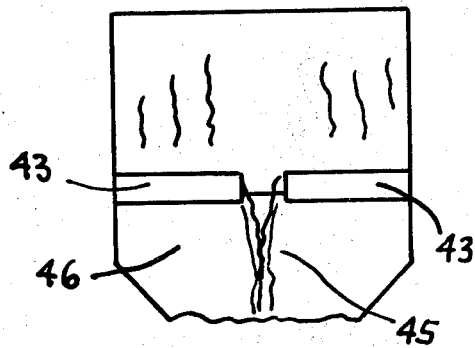
FIGURE 8.-
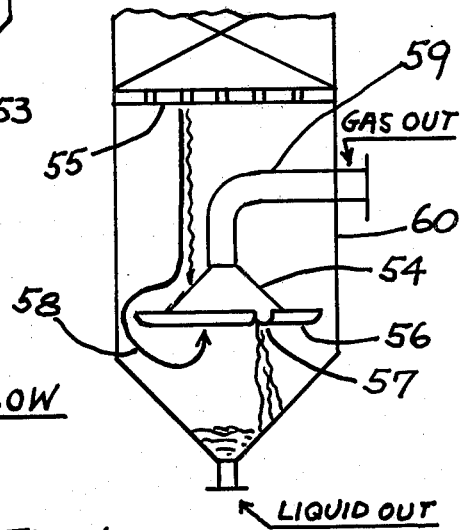
FIGURE 10.-
GAS FLOW
LIQUID FLOW

ENTRAINMENT SEPARATOR IN CO-CURRENT FLOW

This invention describes a new apparatus and method for separating entrained liquids from gases when both are passing co-currently through flow equipment. Whereas in this specification, reference is made only to liquids that are entrained by gases, it is nevertheless understood that this will also include the case of liquids entrained by vapors, saturated or superheated, as well.

Entrainment separation is a difficult problem that is very frequently encountered in the process industries. Most frequently the problem arises in connection with the countercurrent contacting of gases and liquids in vertical towers. In these towers, the liquid passes down the tower, normally by gravity, and the gas is usually pumped or otherwise moved upwardly. The object is to achieve intimate contact between the liquid and the gas. Thus the liquid flow is usually broken up into finely divided streams, by letting the liquid pass over packing means and the gas rise through the interstices of the packing, thus contacting the liquid. Now, since in order to achieve maximum flow capacity in apparatus, the gas is always passed upwardly at as high a velocity as feasible. Some liquid will always be torn upwardly, suspended and moved along with the gas. This liquid is known as entrainment. For obvious reasons it must usually be recovered. The process by which this is done is known as entrainment separation.

Equipment used for entrainment separation in counter-current flow towers is of varied nature and design. Perhaps most frequently used in distillation and gas absorption towers are woven wire mesh pads that are installed into the top of towers. As the gas, carrying the liquid droplets reaches such pads and passes through them, droplets are deposited on the wire strands. As the process continues more and more liquid is held up in the pad, causing the liquid to drip off the pad and back into the tower in the form of relatively large and heavy drops. The gas thus having been freed of most of its physically carried-along liquid passes out of the apparatus. Besides wire mesh pads, the functioning of which have been briefly explained, other devices are used as well, such as special types of packings, as well as crimped metal surfaces, arranged in the top of towers. Crimped metal surfaces, of which a large variety is available for this purpose, are specially crimped sheets that are spaced in close proximity of an inch or less apart from each other. By virtue of their special arrangement and close proximity, a zig-zag flow pattern results which causes the liquid to separate from the gas stream.

Whereas in counter-current apparatus just discussed the amount of liquid carried by the gas is of a very low order of magnitude, rarely exceeding 5 pounds of liquid per 100 pounds of gas flowing, the situation in co-current apparatus is wholly different. Considering a typical co-current contactor and assuming essentially atmospheric air as the gas flowing, say at 15 feet per second linear volocity and considering one square foot of tower cross-section, this may carry along as much as 40,000 pounds per hour per square foot of liquid. This would be equivalent to roughly 1,000 pounds of liquid per 100 pounds of air. It is seen that this amount of entrainment is of an entirely different order of magnitude than the amount normally met in counter-current flow. In view of this drastic difference it is to be expected that virtually none of the conventional counter-current entrainment separation equipment will be serviceable for removal of entrainment from co-current apparatus and that therefore, in co-current flow, entirely new apparatus and methods of separation must be resorted to.

An object of the presention invention is to overcome the severe problem of entrainment separation in co-current contacting, being mindful of the fact that virtually nothing can be gained toward the solution of this problem by relying on the prior art learned from counter-current contacting.

A further object of the present invention is to provide entirely unexpected efficient means for removing the very large amounts of entrainment experienced in co-current apparatus.

Other objects and advantages of the presention invention will become more apparent from a study of the following specification taken with the accompanying drawings wherein:

FIG. 1 is a somewhat schematic elevational view of a tower operating in co-current flow and embodying the present invention;

FIG. 2 is a similar view of the lower section of a co-currently operating tower and embodying a modification of the present invention;

FIG. 3 is a schematic elevational view of a still further modification of the present invention;

FIG. 4 is an elevational view of still another modification of the invention;

FIG. 5 is an elevational view showing a further modification of the lower portion of the tower;

FIG. 6 is an elevational view showing further modifications of the invention;

FIG. 7 is a sectional view taken along line 7—7 of FIG. 6;

FIG. 8 is another sectional view taken along line 8—8 of FIG. 6;

FIG. 9 is a schematic elevational view showing an embodiment of the invention as applied to relatively small rectangular or square co-current flow apparatus;

FIG. 10 is another elevational view showing an embodiment of the invention as applied to relatively small diameter cylindrical co-current flow apparatus.

Figure 11:
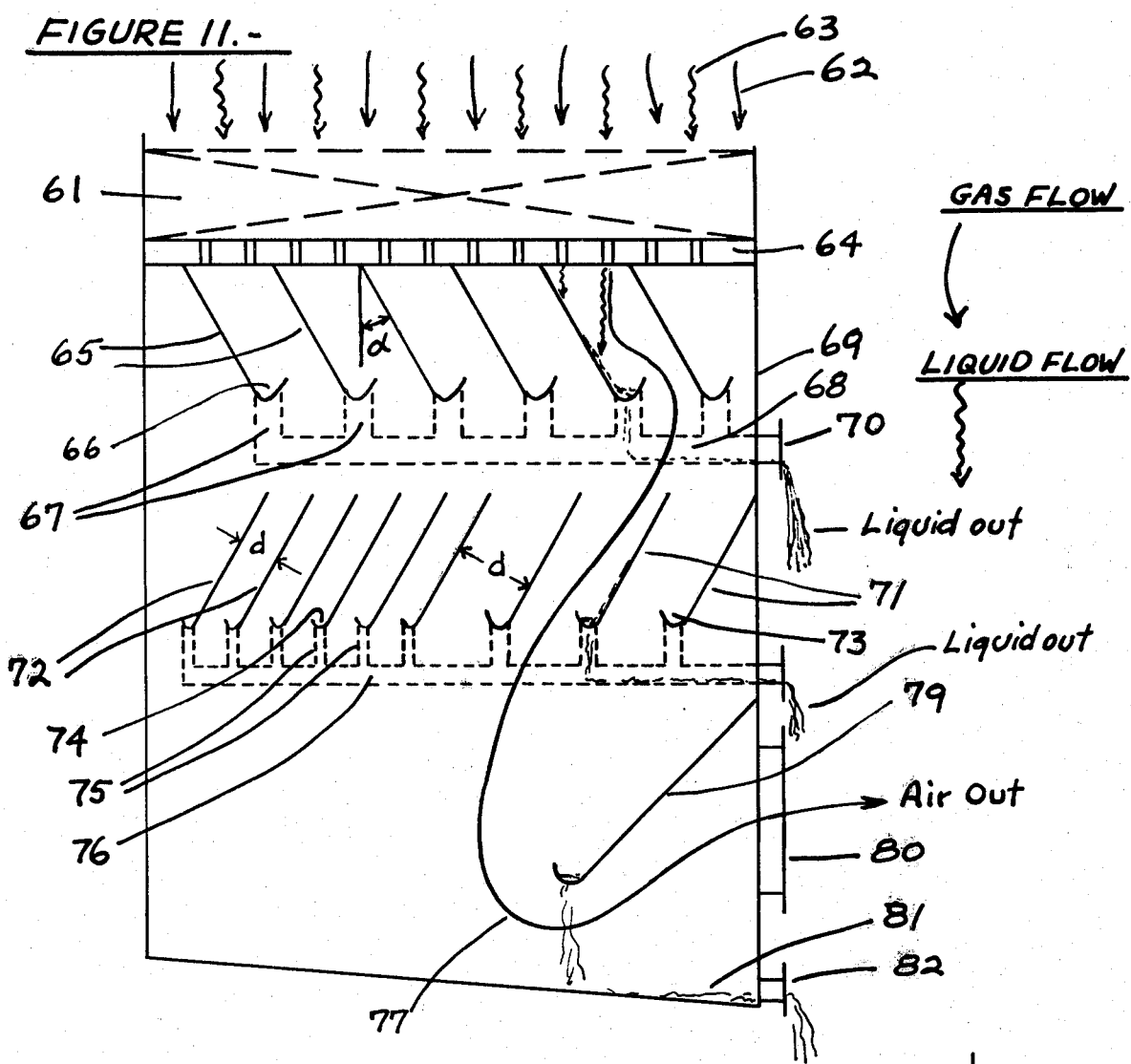
FIG. 11 is another somewhat schematic sectional view of a very large square of rectangular tower embodying another modification of the invention.

Describing now the invention and referring more particularly to FIG. 1, such figure represents a tower operating in co-current flow. The tower shell is indicated by numeral 1 and may be of round, rectangular or polygonal cross section. Provision is made at the top of the tower for the gas to enter through nozzle 2, and for the gas to leave the tower through a similar nozzle 3. The liquid is led to the tower through nozzle 4 at the top, and leaves the tower through nozzle 5. Now, as the liquid enters through nozzle 4 it is first distributed by liquid distributor 6, which divides the liquid into a large number of individual thin streams or perhaps drops. The gas coming through nozzle 2 and the now finely divided liquid coming from liquid distributor 6 enter the top of a contacting zone 7 where the interaction of gas and liquid occurs. The contacting zone may be packed with packing material (with or without a packing support plate 8) or contact plates or other contact means, or it may be just an open tower as, for instance, a spray tower, where the contact between the gas and liquid occurs in this open tower section, while the gas and liquid descend downwardly co-currently.

In the particular case shown in FIG. 1, the contacting means are packing supported by a perforated support plate 8, and it may be noted that both liquid as well as gas pass jointly downwardly through openings 9 in support plate 8. It must be appreciated that the liquid and gas thus passing through and out of the openings 9 are intimately mixed together. Thus the fluid that issues from opening 9 is essentially a stream of gas that carries the liquid along in the form of a large multidude of individual drops. The issuing velocity of the mixture of liquid and gas may attain values of 50 feet per second or more. If this intimate mixture of liquid and gas would not be led through a suitable entrainment separator before withdrawing the gas through nozzle 3, very substantial amounts of liquids would be carried out with the gas. It is therefore significant to have found that all the streams of intimately mixed drops of liquid and gas may readily and effectively be broken up into a coherent liquid phase and essentially liquid-free gas by allowing the liquid-gas streams issuing from openings 9 to hit slanted, parallel disposed baffles 10, indicated below the support plate 8 in FIG. 1. What actually appears to happen is that as the individual and combined streams of liquid and gas issuing from openings 9 emerge co-currently, downwardly and strike the slanted baffles 10, the liquid deposits as a layer 11 on the baffle and runs downwardly. Naturally as this layer of liquid proceeds downwardly, its thickness will increase due to more and more liquid depositing from the top openings 9, above baffle 10. The liquid, thus having been assembled and essentially collected on the top side of the baffle, runs off in the form of a relatively thick and firm chute, indicated by numeral 12. The gas, on the other hand, having been freed of its liquid which is had carried through openings 9 is noted to reflect away from the baffle and is seen to veer off, more or less along the contour and path of the baffle, as indicated by numeral 13. Its velocity now having decreased very drastically from the above mentioned high slot velocity, the gas is no longer able to pick up any appreciable liquid quantities as it pushes through the relatively firm chute of liquid 12 and leaves the apparatus through nozzle 3. Hence the gas thus leaves essentially free of its original entrainment.

In towers of large cross-section, such as indicated in FIG. 1, several baffles 10 will be required, to be spaced essentially parallel from each other, as shown in FIG. 1. Experience has indicated that the distance "$d$" between baffles may in some cases become appreciable. Best results and considering towers of, say 100 square feet cross-section, the distance $d$ should generally not be smaller than 2 inches. As the tower cross-section becomes larger, larger inter-baffle spacings may be required. For very large towers of large rectangular flow cross-sections, the inter-baffle spacing may become a foot or even more.

Another requirement of the baffles should be that they do not exhibit any sharp protruding parts on the upper surface that is exposed to the striking liquid so as not to cause any liquid splashing. Furthermore the absorbing liquid may carry suspended solids, such as, for example, in the limestone scrubbing of power plant stack gases for removal of $SO_2$ referred to again later. Thus if the baffles have obstructions on the upper surface, not only will this hinder the proper collection of liquid droplets and prevent them from combining into liquid layers, but with the use of suspensions, deposits may begin to form around the obstructions, that may eventually interfere with smooth efficient operation.

Of course, with some type of liquid-solids suspensions that may be used in such co-currently operating towers, deposits of solids may nevertheless form on the baffles. In all such cases, the baffles may be fitted with liquid spray nozzles on their upper end or on the sides to rinse the deposits off when needed.

Another important feature of the invention is the angle shown in FIG. 1, which the baffles form with the vertical. Naturally, if the angle is too large, the baffles are no longer effective. Experience has shown that this becomes important when the angle becomes smaller than 15°. On the other hand, if the angle is too large, the liquid will tend to be reflected back into the gas, thus reducing the effectiveness of the device materially. Observation has shown that this appears to occur markedly as the angle $\alpha$ becomes more than 70°. Thus it may be stated that the angle of the baffles with the vertical as denoted by an angle $\alpha$ should be between about 70° and 15°. For most applications, the range of about 65° to 30° is preferred.

FIG. 2 shows a modification of the lower part of a co-currently operating tower. As for FIG. 1 actually three baffles, designated by numeral 14, are shown. In addition to the three baffles shown in FIG. 1 and identified as 14 in FIG. 2, there is also shown below a much larger main collecting baffle, 15. This type of construction, shown in FIG. 2, embodying the ordinary baffles 14 together with the collecting baffle 15 was found particularly useful in towers of rectangular flow cross-section, where the length of the flow cross-section is appreciably larger than its width to cause the dispensed liquid, coming through openings 8, to coalesce into liquid layers 11.

By employing this embodiment, the length and number of baffles 14 may be held to a minimum. As will be seen, all the liquid streams 16 from baffles 14 fall on the collecting baffle 15, from where the liquid runs finally off in the form of a very thick stream 17. It has been found that with this construction the efficiency of removal of the entrainment is appreciably better than without the collecting baffle.

It will be appreciated that as the gas that has been freed of its entrainment passes through a chute of liquid, such as 14 and 17 in FIG. 2, a slight amount of re-entrainment will occur, which means that the gas on pushing through the chute will pick up again a certain amount of small droplets. In order to remove this re-entrained liquid which is present in very low concentrations, it may be necessary to attach, to gas exit nozzle 18, a follow-up conventional entrainment separator of the type discussed earlier in connection with counter-currently operating towers. It must, however, be understood that for all practical purposes, essentially all the entrained liquid has been removed by baffles 14 and 15. Had these baffles been omitted and had the liquid-carrying gas thus be allowed to pass through these conventional entrainment separators sometimes installed in nozzle 18 and required as an after separator, the capacity of the apparatus to carry high gas and liquid rates would have been completely destroyed, as the conventional entrainment separators would have become flooded instantly.

It has been found that with heavy and massive liquid chutes, less liquid is being re-entrained by the gas than when the gas pushes through thin film-type chutes. However, the heavy chutes, in contrast to the thin chutes, will offer more flow resistance to the gas. This means that apparatus with heavy, massive chutes, though causing less re-entrainment, will increase the gas pressure drop through the apparatus. In order to overcome the disadvantages of additional pressure drop with heavy, massive chutes it is therefore desirable to deflect the liquid that runs off the baffles and thus combine the liquid streams into heavier regional streams, and thereby also create a region in the tower through which no chute falls at all.

FIG. 3 is an embodiment of the invention that accomplishes this objective. It will be noted that the baffle 19, in the form of angularly disposed plates so as to form a trough which is downwardly tapered, accomplishes this. As the liquid streams 20 are striking it from above, the liquid is collected centrally and drops off as a particularly heavy chute 21, leaving most of the space 22 below the baffle free of any liquid. The gas which will thus pass through space 22, will therefore not re-entrain any liquid and will leave the apparatus through exit nozzle 23.

FIG. 4 is a similar embodiment as shown in FIG. 3 except that baffle 24 now is in the shape of a roof which is downwardly tapered. It will be noted that liquid chutes 25 run off next to the tower wall as indicated by numeral 25, leaving virtually almost the entire area 26 below the baffle free of any liquid, so that the gas can pass without suffering re-entrainment, leaving the apparatus through exit nozzle 27.

Another embodiment of this idea of collecting the chutes in special regions is shown in FIG. 5. Baffle 28 is now in the form of a corrugated sheet, with the corrugations running length-wise downward. Although this is not shown, the liquid will assemble in the troughs of the baffles, and run downwardly from the troughs of the baffles. The gas, on the other hand, will pass around the baffles, between the troughs of the corrugations and out of the apparatus through exit nozzle 29. Thus this device will also prevent re-entrainment of liquid and will also offer less pressure drop to the gas flowing through the apparatus, very much in the same way as is achieved by construction shown in FIGS. 3 and 4. A modification would be to arrange a plurality of such plates 28 disposed angularly to each other and intersecting at their central axes.

For various reasons, it may not always be practical to resort to the embodiments of the invention shown in FIGS. 3 to 5, to prevent excessive pressure drops due to gas flow through chutes, and to minimize re-entrainment. In these instances, the modifications of the invention shown in FIG. 6 are proposed. FIG. 6 represents a further modified lower tower section and three straight baffles. Referring first to baffle 30, this is fitted with a trough 34. FIG. 7 shows a sectional view 7—7 of baffle 30, and it may be seen that trough 34 extends essentially along the entire lower edge with the exception near the wall of the tower. As will be seen from FIG. 7, in this way the liquid is collected in the trough 34, deflected a stream 35 toward the vessel wall, where it flows to the sump 36 of the tower, leaving essentially almost the entire space 37 below the baffle open for unimpeded gas flow. A further refinement of the device will be noted in FIG. 7. Whereas the chute on the left side of FIG. 7 falls directly and through the open space down into the sump 36, the chute on the right side is seen to empty into a properly sized channel 38, from which it emerges at the bottom of the channel and empties into sump 36, to be removed from the tower by pumping or other means. By resorting to the installation of the channel and allowing the chute to drop through the channel on its way to the sump, essentially a further step is achieved to bring about the isolation of the liquid from the entrainment free gas, and thus lessen further the possibility of re-entrainment.

Returning now to FIG. 6, it may be seen from baffle 31 that in any one baffle, a multitude of troughs may be employed. Thus trough 39 is somewhere halfway up on the baffle. This type of construction, employing a multitude of troughs, may be used in instances where the liquid loading is especially high and where one single trough at the lower edge may become too large, for practical purposes, to carry the liquid away effectively. Of course, although only two troughs are shown on baffle 31, a baffle may be equipped with a larger number of troughs if so required by tower size and irrigation rate of the tower. The lower trough 40 on baffle 31 is seen to be fitted with a rounded-down or reversely bent edge 41. It has been found that this simple means is very effective in minimizing the flow resistance to the gas, the path of which is indicated by numeral 42.

A further modification of trough to minimize the danger of liquid overflowing is shown by numeral 43. The rounded upper edge 44 will accomplish this. At the same time this rounded edge will reduce the flow resistance to the gas in a similar manner as does the rounded-down edge 41 of trough 40.

FIG. 8, taken along section 8-8 of FIG. 6 through baffle 32, shows that the troughs may be arranged in split halves 43, permitting the liquid to fall out at the center 45, thus providing liquid free space 46, available for unobstructed gas flow.

Whereas the details and baffles discussed so far have primarily a bearing on towers of large cross-section, the invention may also be applied to essentially what may be considered to be a small cross-section tower.

Thus FIG. 9 pertains to such a small cross-section tower, either with a square or rectangular flow cross-section. Essentially only two baffles are shown, identified by numerals 47 and 48. However, whereas the baffles in the preceding constructions were assembled in the form of essentially parallel plate elements, depending directly downwardly from the supporting plate, the baffles 47 and 48 of FIG. 9, form a roof structure, with the apex 49 of the roof well below the supporting plate 50. For purposes of illustration, baffle or leg 47 carries no trough, whereas leg 48 of the roof is at its lower edge equipped with a trough 51. The purpose of the trough 51 is, of course, the same as has already been described in FIGS. 6, 7 and 8. It will be noted that with this roofed construction, the gas exits at nozzle 52, which is underneath the roof, facilitating the removal of gas 53 as shown.

FIG. 10 shows still another embodiment of the invention, pertaining in particular to installation in small cross-sectional round towers. As may be seen, the entrainment separating element is in the form of a cone 54, with the apex pointing upwardly, and somewhat below the supporting plate 55, similar to the apex of the roofed construction of FIG. 9. As is noted, the lower edge of the cone is fitted with trough 56, and the liquid emerges through a gap 57 in the trough. The gas flow path, indicated by numeral 58, freed of its re-entrainment is removed through a duct 59, penetrating through the wall of the tower 60 and making contact with the apex of the cone 54.

Having discussed the various elements of design and their modifications, a typical embodiment of a very large application will be discussed briefly, that may be used in air pollution abatement. Due to the nature of this problem, extremely large air quantities will have to be handled and will have to be contacted with generally large liquid quantities. Since this is an operation at essentially atmospheric pressure, square or rectangular cross-section towers may be used, and the walls of the towers can be constructed by relatively thin plate or sheeting.

In this connection, it would appear advantageous to use, as a basic unit, a tower element of square cross-section, say measuring 12 feet on each side. Then as more throughput is required for future expansion, additional such square tower elements may be added on in domino fashion, until the desired tower capacity has been provided. Each such tower element may then be operated at will or shut down for cleaning as the case may require. Simply by manipulating simple valving in the air piping used in the air feed lines. Of course, each such tower element has then its own entrainment separator system.

FIG. 11 represents such a square tower element and for convenience let us make the dimensions of the flow cross-section equal to 12 feet long and 12 feet wide. The tower is filled with packing or other means designated by 61 to bring about contact between the phases. The air and liquid enter the packing from above, indicated by numerals 62 and 63. The phases leave the packing through the support plate 64. Below the support plate 64 there are arranged a multitude of baffles 65, all more or less parallel with each other, and each carrying a trough 66 on its lower edge. Preferably the spacing of these baffles is rather close, say from 6 to 12 inches, so that with the prevailing angle $\alpha$ the length of the baffles does not become unduly long. The liquid and gas are seen to emerge from plate 64 and in accord with the nature of the invention the liquid collects on the baffle and runs into the trough. It is noted that all the ends of the troughs are connected to stand pipes 67, which, in turn, communicate with common collecting pipe 68. The stand pipes and the common collecting pipe are shown by dotted lines to indicate that they are either running along the vertical wall of the tower or along the center of the tower. The common collector pipe 68 will eventually extend through the wall of the tower 69 in the form of nozzle 70. After passing through some suitable trap arrangement ( not shown in FIG. 11) the liquid is finally discharged into storage or processing vessels.

Now it will be appreciated that since very large liquid rates are carried in the air and the air velocity is rather high some residual entrainment may still be carried along beyond the troughs 66. In order to collect this secondary entrainment, a secondary row of baffles, indicated by numbers 71 and 72, is provided below collecting pipe 68.

It will be noted that baffles 71 are spaced at essentially the same distance apart as are baffles 65 in the upper bank. However, baffles 72 are seen to be spaced more closely together. Whereas one would normally not space the baffles in any one row at different distances apart, the closer spacing shown with baffles 72 is merely shown to exemplify that in a second or, for that matter, a third or fourth row of baffles one may wish to resort to a closer spacing, simply because the air is leaner as far as liquid content is concerned and with this leaner liquid concentration, a closer baffle spacing may be needed to eliminate these lesser and more difficult to remove quantities of liquid. It is also noted that baffles 71 and 72 carry troughs 73 and 74 which are connected to stand pipes 75, which eventually communicate with the common collecting pipe 76.

All along the air is passed through the two rows of baffles, as indicated by 77. It finally enters the essentially open base of the tower. Eventually the air sweeps around the last main baffle 79 and out of the apparatus through nozzle 80. Any residual liquid that is still precipitated collects in sump 81 and is delivered to the outside by nozzle 82, after this has been connected properly to a trap, not shown in FIG. 11.

In many instances the flat baffles indicated in FIG. 11, fitted with the essentially horizontal troughs will be satisfactory in all such cases where essentially clean liquids are used for absorption. This is, for example, the case when $SO_2$ is recovered by solutions of sodium hydroxide or sodium carbonate. However, when the liquid flow rates become very high and, moreover, when the scrubbing of the $SO_2$ is done with a slurry of limestone flat baffles and horizontal troughs may not be feasible. In all such cases where the flow rates are very high or where precipates are contained in the liquid, it has been found necessary to impart a slope to the baffles as well as to the troughs.

Figure 12:
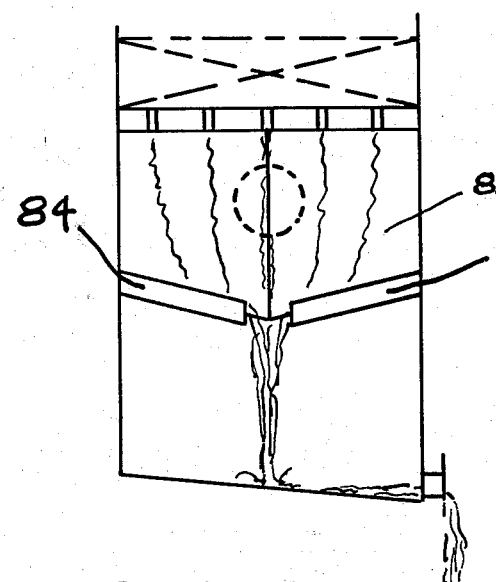
FIG. 12, is another sectional view of details that comprises the construction of the invention elaborated in FIG. 11; and, FIG. 13 is a further sectional view of a further construction detail of the invention described in FIG. 11.

With this in mind, FIG. 12 shows a lower tower section where the baffle 83 forms a trough by itself. It is furthermore seen that the troughs 84 have an appreciable slope as well. This will assure that no deposits are formed in the troughs.

Figure 13:
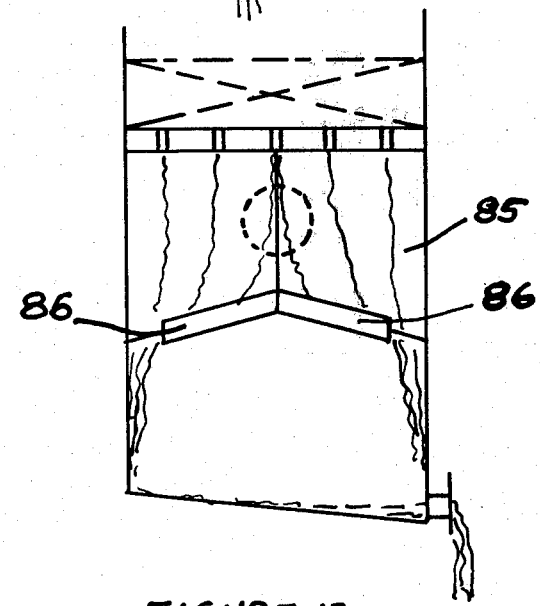

FIG. 13 is similar to FIG. 12, but now the baffle 85 slopes like a roof toward the sides and it is seen that the attached troughs 86 slope as well,- again in order to prevent solid deposits. It will be noted from FIG. 11 that normally the liquid stream empties from the trough into the stand pipes 67 and 75. These have been omitted from FIGS. 12 and 13, the object having been to shown the sloping of the baffles along with suitable sloping of the troughs.

Thus it will be seen that I have provided a highly efficient and compact entrainment separator, for separating entrained liquids from gases when both pass co-currently downwardly in a tower, which occupies a minimum of floor space.

While I have illustrated and described several modifications of my invention it will be understood that these are by way of illustration only and that various changes and modifications may be contemplated in my invention and within the scope of the following claims.

I claim:

1. The method of separating entrained liquids from gases, comprising introducing separate streams of liquid and gas at the top portion of a tower, forming the liquid into a dispersed state entrained by gas, passing the gas and entrained liquid through a contacting zone, allowing the gas and entrained liquid to leave the contact zone and allowing the combined streams of gas and entrained liquid to be directed towards slanted baffle plates disposed below said contacting zone, causing the dispersed liquid to wet said baffle plates, thus forming a liquid layer on top of said baffle plates which runs downwardly toward the lower edge of said baffle plates and empties into a sump of the tower, to form at least one concentrated liquid stream, and diverting the gas now substantially freed of liquid around said lower edge and away from said baffle plates and out of said tower.

2. The method recited in claim 1 wherein said baffle plates comprise a plurality of plates extending in parallel relationship at an angle of about 70° to 15° with respect to the vertical.

3. Apparatus for separating entrained liquids from gases, comprising flow apparatus in substantially the shape of a tower, means for introducing separate streams of gas and liquid into the top portion of said tower, means for converting the downwardly flowing stream of liquid into droplets which become entrained with said gas, contacting means through which said gas-entrained liquid droplets are passed downwardly by gravity, baffle means located below said contacting means and disposed at an angle relative to the vertical so as to form definite streams of said liquid droplets, leaving a large space, exposed to the lower edge of said baffle means, into which released gas will flow, and means for discharging said released gas, which is substantially liquid-free, from said tower.

4. Apparatus as recited in claim 3 wherein said baffle means comprises a plurality of spaced parallel baffle plates disposed at an angle of about 70° to 15° relative to the vertical.

5. Apparatus as recited in claim 4 wherein said angle of said baffle plates is between about 65° to 30°.

6. Apparatus as recited in claim 4 together with an additional baffle plate below said baffle means and extending angularly downwardly in the opposite direction of said spaced parallel baffle plates.

7. Apparatus as recited in claim 3 wherein said baffle means comprises at least one baffle plate of V shaped cross-section to form a trough to concentrate said droplets of gas entrained liquid leaving said contacting means in the form of at least a single liquid stream, leaving the remainder of the space in said tower for the released gas to occupy before discharging it from said tower.

8. Apparatus as recited in claim 3 wherein said baffle means comprises a corrugated baffle plate located below said contacting means and which is downwardly tapered.

9. Apparatus as recited in claim 3 wherein said baffle means comprises a roof shaped trough which is downwardly tapered.

10. Apparatus as recited in claim 4 wherein trough portions are provided at the bottom of said baffle plates.

11. Apparatus as recited in claim 3 wherein said baffle means comprises a cone having an upwardly extending apex from which a gas outlet tube extends and having a bottom circular trough with a slot from which slot liquid flows downwardly in the form of a stream which exits from the bottom of said apparatus.

12. Apparatus as recited in claim 4 together with a second plurality of parallel baffle plates located beneath said first mentioned plurality of spaced parallel baffle plates extending angularly downwardly in an opposite direction from said first mentioned plurality of spaced parallel baffle plates at an angle of about 70° to 15° relative to the vertical, all of said baffle plates having trough portions at their lower ends, collecting pipe means located below said trough portions for conducting liquid draining from said trough portions to the exterior of said tower.

13. Apparatus as recited in claim 12 wherein said second plurality of baffle plates are a shorter distance apart than said first mentioned plurality of parallel baffle plates.

14. Apparatus as recited in claim 10 together with stand pipe means extending vertically below said trough portions in a position to collect drainage from said trough portions for draining it into said sump.

* * * * *